United States Patent

Hori

[15] 3,683,127

[45] Aug. 8, 1972

[54] MULTI-CHANNEL SEMICONDUCTOR MAGNETIC HEAD

[72] Inventor: Keiichi Hori, Tokyo, Japan

[73] Assignee: Pioneer Electronic Corporation, Tokyo, Japan

[22] Filed: April 27, 1971

[21] Appl. No.: 137,934

[30] Foreign Application Priority Data

Apr. 28, 1970 Japan..................45/41239

[52] U.S. Cl. ........................................179/100.2 CH
[51] Int. Cl. ............................................G11b 5/38
[58] Field of Search ...........................179/100.2 CH

[56] References Cited

UNITED STATES PATENTS 3,114,009 12/1963 Camras et al. ...179/100.2 CH

*Primary Examiner*—Howard W. Britton
*Assistant Examiner*—Robert S. Tupper
*Attorney*—Sughrue, Rothwell, Mion, Zinn & Macpeak

[57] ABSTRACT

A multi-channel semiconductor magnetic head which has a plurality of Hall elements connected in series in such a manner that the voltage terminal of the magnetic recording material side of each Hall element is connected directly to one current terminal of a succeeding Hall element. The other voltage terminal and the other current terminal of the Hall elements are physically drawn in opposite directions of the magnetic recording material facing surface whereby an electric current is supplied to one Hall element and a Hall voltage is developed between a lead terminal of the Hall element and a lead terminal of the succeeding Hall element.

2 Claims, 2 Drawing Figures

INVENTOR
KEIICHI HORI
BY
Sughrue, Rothwell, Mion, Zinn & Macpeak
ATTORNEYS

MULTI-CHANNEL SEMICONDUCTOR MAGNETIC HEAD

BACKGROUND OF THE INVENTION

1. Field of the Invention

This invention relates to a multi-channel semiconductor magnetic head using Hall elements for stereo reproduction.

2. Description of the Prior Art

As the number of channels are increased when a multi-channel semiconductor magnetic head is manufactured, the number of leads from the magnetic head becomes large, causing problems with the leads. Even if the leads are provided, it takes time to treat the wire for the leads, resulting in high cost. When the leads are provided by means such as deposition, if the leads are crossed, the manufacturing becomes very difficult with the result that there must be a multi-channel head of a pattern having a minimum number of leads without crossing the leads.

Heretofore, three-terminal multi-channel head patterns have lessened the number of leads for satisfying the aforementioned purpose, but the output power voltage becomes smaller than the four terminal multi-channel head pattern. Also, the noise generated in the head elements is included in the output power voltage so that high quality reproduction cannot be obtained.

In a conventional multi-channel magnetic head, one output terminal of each Hall element head is commonly connected so that a control current is supplied in parallel to all the Hall elements in the head with the resulting disadvantage that crosstalk is generated in the path between the Hall elements of the head.

SUMMARY OF THE INVENTION

The present invention contemplates the elimination of the aforementioned disadvantages of the conventional multi-channel magnetic head and provides a novel and improved multi-channel semiconductor magnetic head.

It is therefore, one object of the present invention to provide a multi-channel semiconductor magnetic head which has less tracks than a conventional head.

It is another object of the present invention to provide a multi-channel semiconductor magnetic head which does not have crossing leads.

It is a further object of the present invention to provide a multi-channel semiconductor magnetic head which may prevent the output from decreasing as in conventional three terminal head patterns.

It is still another object of this invention to provide a multi-channel semiconductor magnetic head which may eliminate the crosstalk in the magnetic head when reproducing a stereo sound.

It is still another object of the invention to provide a multi-channel semiconductor magnetic head which is less expensive.

According to the present invention, there is provided a multi-channel semiconductor magnetic head which comprises a plurality of Hall elements connected in series in such a manner that the voltage terminal of the magnetic recording material side of one Hall element is connected directly to one current terminal of a succeeding Hall element. The other voltage terminal of the other current terminal of the Hall elements are physically drawn in the opposite direction of the magnetic recording material facing surface, whereby an electric current is supplied to one Hall element and a Hall voltage is developed between a lead terminal of the Hall element and a lead terminal of the succeeding Hall element.

The other features and advantages of the present invention will become apparent from the following description taken in conjunction with the accompanying drawings.

DESCRIPTION OF THE PREFERRED EMBODIMENT

Figure 1:
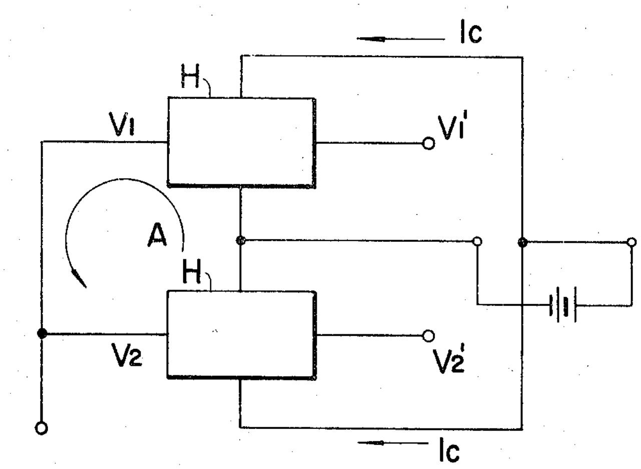
FIG. 1 is an explanatory view of a conventional multi-channel semiconductor magnetic head.

For better understanding of the multi-channel semiconductor magnetic head, a conventional multi-channel magnetic head will now be described with reference to FIG. 1.

The output terminals V1 and V2 of one side of Hall element heads H and H are commonly connected so that a control current Ic is supplied in parallel to the respective Hall element heads. This results in crosstalk generated in the path between the Hall element heads H and H designated by an arrow A.

Figure 2:
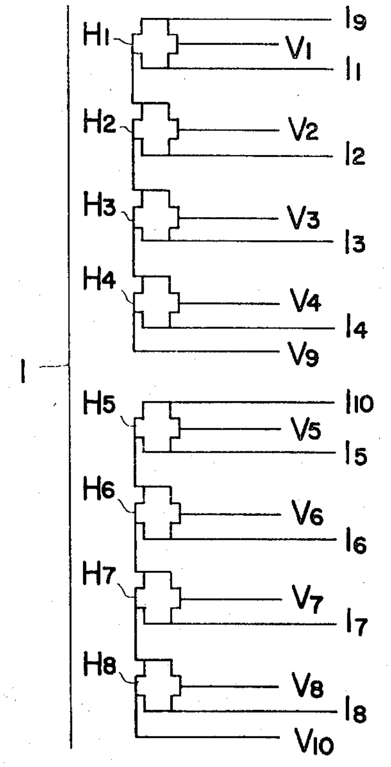
FIG. 2 is an explanatory view of the preferred embodiment of a multi-channel semiconductor magnetic head pattern according to the present invention.

Reference is now made to FIG. 2, which shows one embodiment of the head pattern of an eight channel, four track head in accordance with the present invention. Reference characters H1 to H8 designate the Hall elements formed by depositing means on respective ferrite substrates. The voltage terminals of one side of the respective Hall elements H1 to H8 are facing a magnetic tape 1. Simultaneously, these elements are disposed along the lateral direction of the magnetic recording material at constant intervals in such a manner that the magnetic fields of the respective tracks recorded on the magnetic recording material 1 are applied to the facing Hall elements. The aforesaid Hall elements are divided into two blocks of H1 to H4 and H5 to H8 for stereo sound reproduction. The elements H1 to H4 are used for the L-channel while the elements H5 to H8 are used for R-channel at the same time. The Hall elements H1 to H4 and H5 to H8 in the respective channels are, in turn, so connected that the voltage terminal of the magnetic recording material side of a Hall element in one stage is connected directly to the current terminal of the Hall element in the next stage. Voltage lead terminals V1 to V8 respectively are formed by means such as depositing at the other voltage terminal of the Hall elements. The current lead terminals I1 to I8 are formed by means such as depositing similar to the above voltage lead terminals at the other current terminals of the Hall elements H1 to H8. All the leads are formed in such a manner that they are not crossed with each other or with current lead terminals I9 to I10 or voltage lead terminals V9 and V10 which are also formed by depositing means.

Accordingly, when stereo is reproduced by the L- and R- channels, a constant DC current may be supplied so the Hall elements H1 and H5, H2 and H6, H3 and H7, and H4 and H8 are operated simultaneously. It follows that when the Hall elements H1 and H5 are operated, if control current Ic flows between the lead terminals I9 and I1, and lead terminals I10 and I5, the Hall voltage generated by the magnetic field of the magnetic recording material 1 of the respective Hall elements H1 and H5 is derived from the lead terminals V1 and V2, and V5 and V6 through the Hall element of the next stage.

If control current Ic flows between the lead terminals I1 and I2, and lead terminals I5 and I6 through the Hall element of the former stage at the Hall elements H2 and H6, the Hall voltage of the respective Hall elements H2 and H6 is derived from the lead terminals V2 and V3, and V6 and V7 through the Hall elements of the next stage.

Similarly, the Hall voltage is derived from the respective lead terminals V3 and V4, V5 and V6, and V7 and V8, V8 and V10 by the system similar to the above at the Hall elements H3, H4 and H7, H8, respectively.

It should be understood from the foregoing description that the respective Hall elements are, in turn, connected so that the voltage terminal of the magnetic recording material side of the Hall element in one stage is connected directly to a current terminal of the Hall element in the next stage in the multi-channel semiconductor magnetic head. The control current is supplied directly to the Hall element of one stage at the same time that the Hall voltage of the Hall element is developed between the voltage lead terminal of the Hall element and a voltage terminal of the succeeding Hall element. Therefore, the lead terminals of the Hall elements are commonly used so that 20 leads may be enough for an eight track, four-channel multi-channel magnetic head. A conventional multi-channel magnetic head of this type needs 32 leads. Furthermore, since the multi-channel semiconductor magnetic head of this invention has no crossing lead portions there is no difficult in manufacturing even if the leads are made by depositing means.

It should be also understood that the multi-channel magnetic head of this invention may prevent the output power from decreasing such as in convention three-terminal head patterns. Crosstalk produced in conventional reproduction of stereo sound is eliminated and a less expensive magnetic head may be provided.

It should be also understood that this invention is not restricted to only eight track, four-channel magnetic heads, but may be applied for the other type of magnetic heads.

While the invention has been particularly shown and described with reference to the preferred embodiment thereof, it will be understood by those skilled in the art that various changes in form and details may be made therein without departing from the spirit and scope of the invention.

I claim:

1. A multi-channel semiconductor magnetic head comprising a plurality of successive Hall elements connected in series in such a manner that the voltage terminal of the magnet recording material side of one Hall element is connected directly to one current terminal of a succeeding Hall element and the other voltage terminal of the Hall elements and the other current terminal of the Hall elements are physically drawn in the opposite direction of the magnetic recording material facing surface whereby an electric current is supplied to the first Hall element in the series between the one current terminal and the other current terminal of the first Hall element and current is supplied to any other Hall element in the series between the other current terminal of the preceeding Hall element and the other current terminal of said other Hall element and a Hall voltage for any Hall element is developed between the other voltage terminal of the Hall element and the other voltage terminal of the succeeding Hall element.

2. A multi-channel semiconductor magnetic head as set forth in claim 1, wherein said Hall elements are divided into two blocks for stereo sound reproduction in such a manner that one block is used for the L-channel while the other block is for the R-channel.

* * * * *